United States Patent
Komatsuzaki et al.

(10) Patent No.: US 7,227,978 B2
(45) Date of Patent: Jun. 5, 2007

(54) IMAGE INPUT DEVICE

(75) Inventors: Sakae Komatsuzaki, Iruma (JP); Tsuneharu Takeda, Hamura (JP); Tatsuo Arai, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 792 days.

(21) Appl. No.: 10/463,020

(22) Filed: Jun. 16, 2003

(65) Prior Publication Data
US 2003/0235329 A1 Dec. 25, 2003

(30) Foreign Application Priority Data
Jun. 20, 2002 (JP) ............... 2002-180300
Sep. 4, 2002 (JP) ............... 2002-258789

(51) Int. Cl.
*G06K 9/00* (2006.01)
(52) U.S. Cl. .................................... 382/124
(58) Field of Classification Search ................ 382/124, 382/126, 296, 312
See application file for complete search history.

(56) References Cited

U.S. PATENT DOCUMENTS

| | | | |
|---|---|---|---|
| 4,550,999 A * | 11/1985 | Anderson | .................... 399/305 |
| 6,041,410 A | 3/2000 | Hsu et al. | |
| 6,282,303 B1 | 8/2001 | Brownlee | |
| 6,324,310 B1 | 11/2001 | Brownlee | |
| 2001/0052541 A1 | 12/2001 | Kang et al. | |
| 2003/0016848 A1 | 1/2003 | Kitajima | |
| 2004/0234112 A1 | 11/2004 | Boker et al. | |
| 2005/0100197 A1 | 5/2005 | Kita | |

FOREIGN PATENT DOCUMENTS

| | | |
|---|---|---|
| EP | 0 128 672 A1 | 12/1984 |
| EP | 0 924 656 A2 | 6/1999 |
| JP | 10-79017 A | 3/1998 |

(Continued)

OTHER PUBLICATIONS

Related U.S. Appl. No. 10/732,776, filed Dec. 9, 2003, Entitled: Card Type Device Capable of Reading Fingerprint and Fingerprint Identification System, Inventor: Kazunori Kita.

*Primary Examiner*—Daniel Miriam
(74) *Attorney, Agent, or Firm*—Frishauf, Holtz, Goodman & Chick, P.C.

(57) ABSTRACT

An image input device 1 includes a rotating roller 4 supported so as to be freely rotatable around a rotational axis thereof, wherein the roller 4 includes a line image sensor 3 and a Selfoc lens array 6 which are mounted not to rotate in the rotating roller 4 by a holder 51. The holder 51 functions as a light guide to introduce the light emitted from light emitting elements 52 to a finger 200 which is pressed against the peripheral surface of the rotating roller 4. Selfoc lens array 6 forms a one-dimensional optical image of the portion of the finger 200 which is in contact with the peripheral surface of the rotating roller 4, on the line image sensor 3, so that the line image sensor 3 obtains the one-dimensional optical image. Then, the one-dimensional optical images are combined by a composite buffer 15 in order, to create a two-dimensional optical image of the finger 200.

11 Claims, 15 Drawing Sheets

| | FOREIGN PATENT DOCUMENTS | |
|---|---|---|
| JP | 2000-048177 A | 2/2000 |
| JP | 2000-182025 A | 6/2000 |
| JP | 2001-243444 A | 9/2001 |
| JP | 2002-133402 A | 5/2002 |
| KR | 2001-0000534 A | 1/2001 |
| KR | 2001-0022253 A | 5/2001 |
| KR | 2001-0113916 A | 12/2001 |
| WO | WO 96/17480 A2 | 6/1996 |
| WO | WO 96/63476 A1 | 12/1999 |
| WO | WO 00/27471 A1 | 5/2000 |
| WO | WO 01/67390 A1 | 9/2001 |
| WO | WO 02/073516 A1 | 9/2002 |

* cited by examiner

LEFT ← → RIGHT

Fig. 11
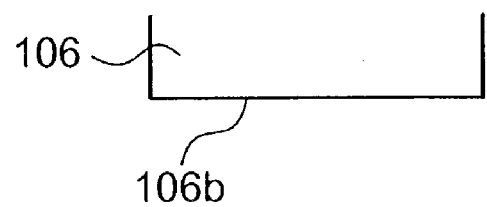
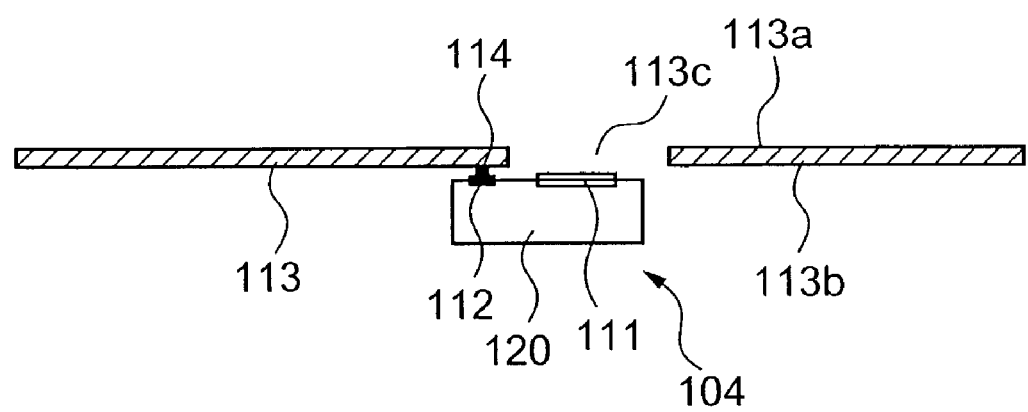

7,227,978 B2

IMAGE INPUT DEVICE

BACKGROUND OF THE INVENTION

1. Field of the Invention

The present invention relates to an image input device for inputting an optical image of a subject.

2. Related Art of the Invention

Recent advancement of the networking of electronic devices has made it possible to freely perform communications between electronic devices, and also has enabled users to access various information from any place. In connection with such a situation, the importance of security to prevent illegal accesses from malicious persons has been enhanced more and more. One of security techniques is based on personal authentication using a fingerprint, and a technique for applying the fingerprint-based personal authentication to portable electronic equipment has been proposed. In order to implement this technique, it is required to equip portable electronic equipment with a fingerprint reading device for reading a fingerprint of a person being authenticated.

In order to equip the fingerprint reading device to the portable electronic equipment, it is desired that the fingerprint reading device is designed in a compact size.

Therefore, an object of the present invention is to provide an image input device such as a fingerprint reading device which is suitable for miniaturization.

SUMMARY OF THE INVENTION

In accordance with a first aspect of the present invention, the image input device comprises:

a transparent cylinder that is freely rotatably mounted on a base and has an outer peripheral surface with which a subject comes into contact, the outer peripheral surface being exposed from a housing;

a one-dimensional image sensor disposed in the cylinder so as to be in parallel to a rotational axis of the cylinder;

an optical system disposed in the cylinder for forming on the one-dimensional image sensor an image of the subject coming into contact with the outer peripheral surface of the cylinder; and a holder that is disposed in the cylinder and fixed to the base and has a through hole, the optical system being mounted in the through hole of the holder while the one-dimensional image sensor is mounted at the lower portion of the through hole of the holder.

In accordance with a second aspect of the present invention, the image input device comprises:

a transparent cylinder supported freely rotatably around the rotational axis thereof;

a one-dimensional image pickup element disposed in the cylinder;

and an optical system disposed in the cylinder for forming an image of a subject coming into contact with the outer peripheral surface of the cylinder on the one-dimensional image pickup element, wherein the one-dimensional image pickup element is designed to have a photoreceptive portion comprising photoelectric conversion elements arranged in a line on a silicon substrate, and the silicon substrate is mounted on the back surface of a film substrate having a surface facing the optical system so that the photoreceptive portion receives light emitted from the optical system.

In accordance with a third aspect of the present invention, the image input device, comprises:

a transparent cylinder supported freely rotatably around the rotational axis thereof;

a one-dimensional image pickup element disposed in the cylinder; and an optical system disposed in the cylinder for forming an image of a subject coming into contact with the cylinder on the one-dimensional image pickup element, wherein the optical system comprise a lens optical system to which reflection light from the subject coming into contact with the outer peripheral surface of the cylinder is incident and then from which the reflection light is emitted, and a reflection optical system for reflecting the light emitted from the lens optical system at least twice to emit the light substantially in parallel to the optical axis of the lens optical system and in the opposite direction to the optical axis of the lens optical system, the one-dimensional image pickup element receiving the light emitted from the reflection optical system.

BRIEF DESCRIPTION OF THE DRAWINGS

FIG. 11 is an enlarged cross-sectional view of a one-dimensional (linear) image pickup element shown in FIG. 10 and the periphery thereof;

DESCRIPTION OF THE PREFERRED EMBODIMENTS

Figure 1:
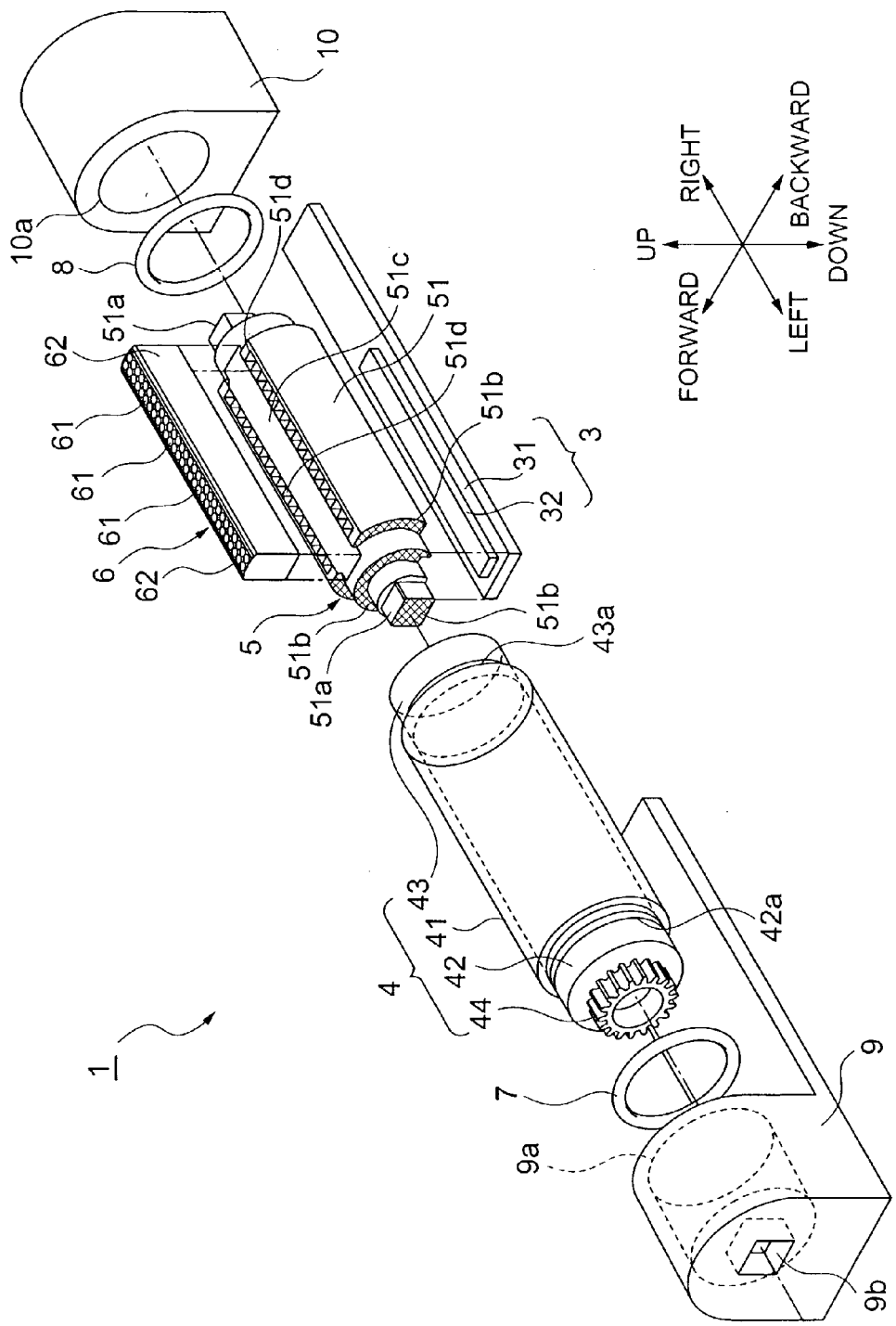
FIG. 1 is an exploded perspective view showing an image input device.
Figure 2:
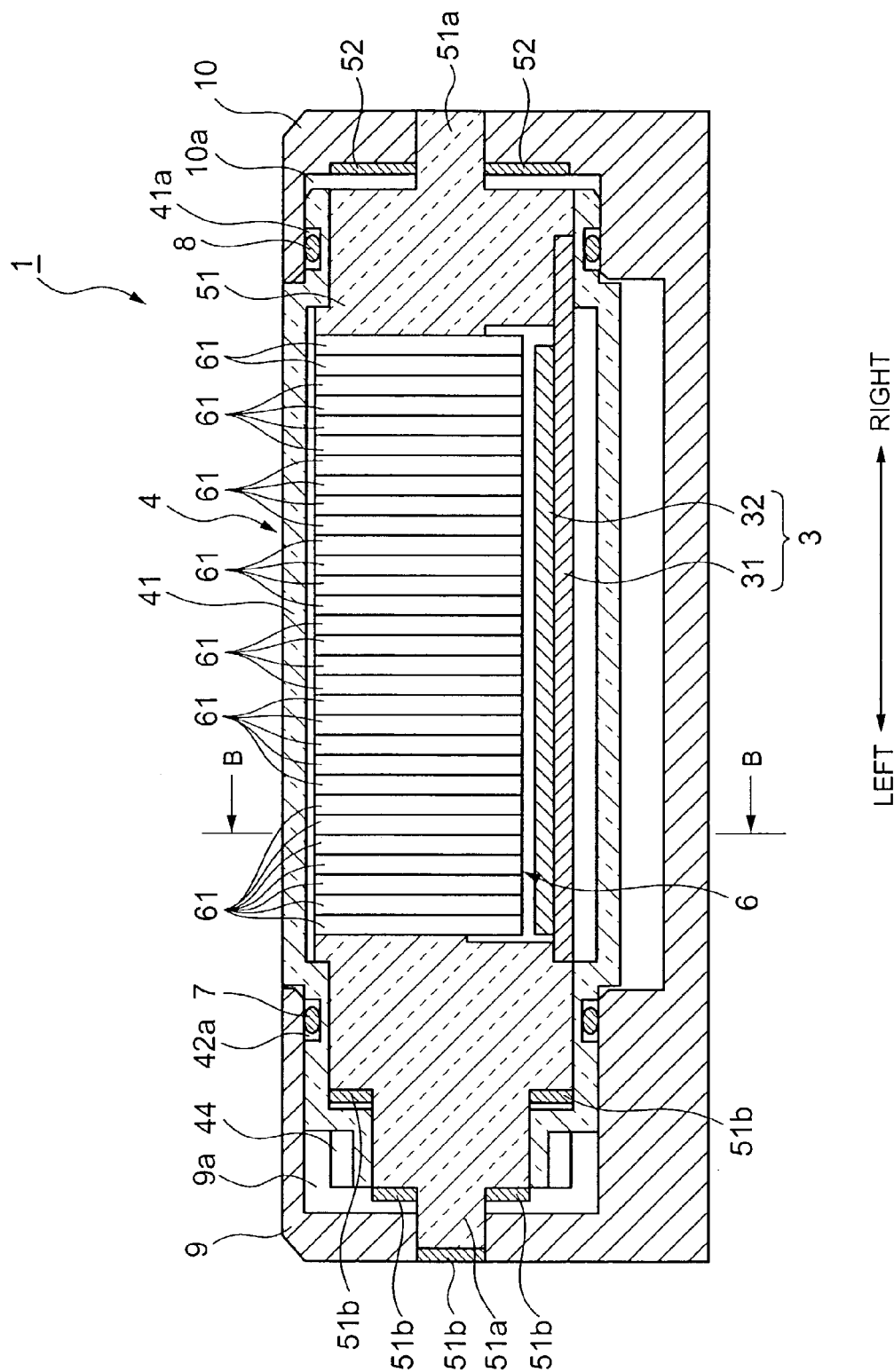
FIG. 2 is a longitudinally-sectional view of the image input device shown in FIG. 1.
Figure 3:
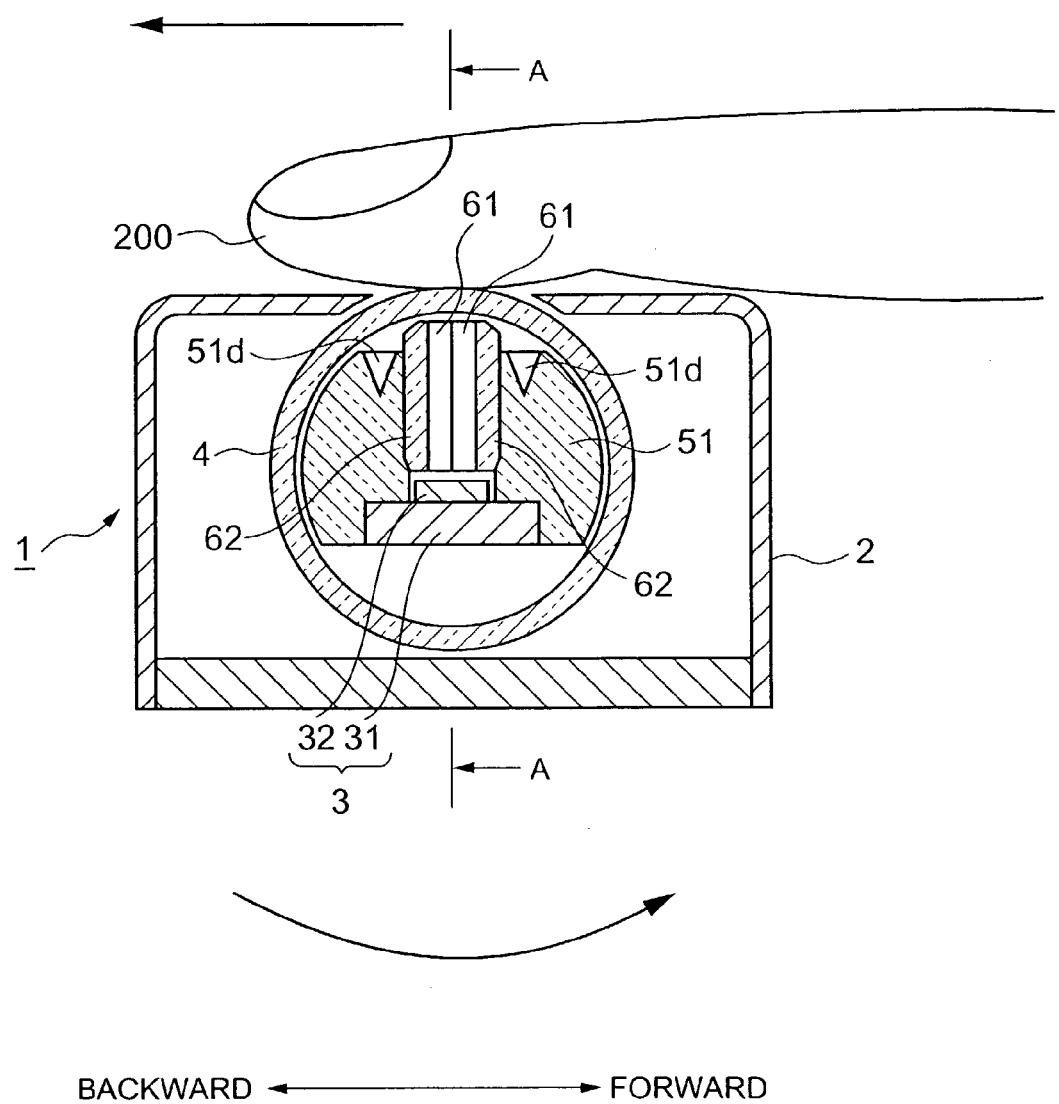
FIG. 3 is a cross-sectional view of the image input device shown in FIG. 1.

FIG. 1 is an exploded perspective view showing an image input device 1 for inputting an optical image of a subject, FIG. 2 is a longitudinally-sectional view of the image input device 1 and FIG. 3 is a cross-sectional view of the image input device 1. FIG. 2 is the cross-sectional view taken along a cutting-plane line A—A of FIG. 3, and FIG. 3 is the cross-sectional view taken along a cutting-plane line B—B of FIG. 2.

The image input device 1 is suitably equipped to portable electronic equipment such as a cellular phone, PDA (Personal Digital Assistant), a laptop personal computer or the like. However, it may be equipped to other types of electronic equipment. Furthermore, the image input device 1 may exist as a single body. In the following embodiments, the image input device 1 is directed to a fingerprint reading device for achieving a contrast image represented by irregularities (unevenness) of the fingerprint of a finger 200 as a subject, however, it may achieve a contrast image represented by a pattern on the smooth surface of a subject.

The image input device 1 is equipped with a housing 2 (abbreviated from the illustration in FIGS. 1 and 2), a line image sensor 3 for achieving a one-dimensional optical image, a rotating member 4 against which a subject such as a finger 200 (abbreviated from the illustration in FIGS. 1 and 2) or a sheet is pressed, a light irradiator 5 for irradiating light to the finger 200, a Selfoc lens array 6 as an optical system for forming an optical image of the finger 200 on the line image sensor 3, annular O-rings 7,8 as elastic members, a first base 9 and a second base 10 serving as roller bearings for supporting the rotating member 4 so that the rotating member 4 are freely rotatable, a timing clock generator 11 (shown in FIG. 5 or the like) for generating timing clocks for scan timing of the line image sensor 3 by generating a pulse (synchronous signal) every time the rotating member 4 rotates by a predetermined angle, and the like.

The image input device 1 is designed to achieve an image of a fingerprint defined by irregularities of the finger 200 when a person being authenticated rotates the rotating member 4 with his/her finger 200. The following description will be made on the assumption that the axial direction of the rotating member 4 corresponds to a right-and-left direction and the optical-axis direction of the line image sensor 3 (the direction along which the line image sensor 3 faces) corresponds to an up-and-down direction.

First, the line image sensor 3 will be described.

As shown in FIGS. 1 to 3, the line image sensor 3 has a flat board 31 whose longitudinal direction corresponds to the right-and-left direction, and a photoreceptive portion 32 mounted on the board 31. The photoreceptive portion 32 comprises one or two arrays of a plurality of photoelectric conversion elements arranged in the right-and-left direction, each of which has an electrical characteristic (for example, voltage level, current level, magnitude of charge, level of electrical resistance or the like) conformed with the amount of incident light. The photoelectric conversion elements are constructed by CCD (Charge Coupled Device), a CMOS image sensor, or a semiconductor device formed of amorphous silicon. The line image sensor 3 is disposed inside the rotating member 4 with being placed face up.

Next, the rotating member 4 will be described.

Figure 4:
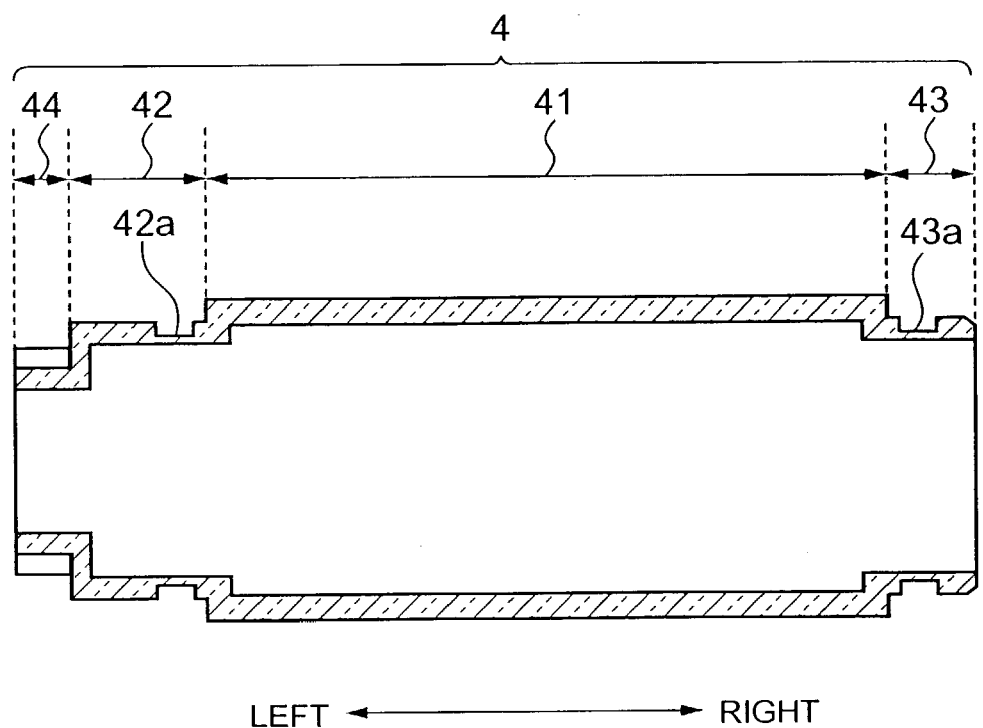
FIG. 4 is a longitudinally-sectional view of a rotating member equipped to the image input device.

FIG. 4 is a cross-sectional view of the rotating member 4.

As shown in FIGS. 1 to 4, the rotating member 4 is designed in a substantially cylindrical shape. The rotating member 4 is formed of transparent acrylic resin, however, it may be formed of borosilicate glass, quartz glass or other glass, or a transparent material such as polycarbonate or other types of resin. The rotating member 4 comprises a right-side cylinder portion 43, a center cylinder portion 41, a left-side cylinder portion 42 and a gear portion 44 which are arranged in this order from the right side of the rotating member 4, and these portions are integrally formed with one another.

The center cylinder portion 41 is designed to be annular in section. The center cylinder portion 41 serves as a main body of the rotating member, and the rotating member 4 has the largest diameter at the center cylinder portion 41. Very minute irregularities (unevenness) are formed on the outer peripheral surface of the center cylinder portion 41, and the outer peripheral surface becomes a so-called embossed surface. AS described above, the outer peripheral surface of the center cylinder portion 41 is roughened, and thus light incident to the outer peripheral surface of the center cylinder portion 41 is diffused. The outer diameter of the center cylinder portion 41 is set to about 7 mm.

The right-side cylinder portion 43 of the rotating member 4 is coaxial with the center cylinder portion 41, and the diameter of the right-side cylinder portion 43 is set to be smaller than that of the center cylinder portion 41. A groove 43a is formed on the outer peripheral surface of the right-side cylinder portion 43 so as to make a round in the circumferential direction of the outer peripheral surface. The O-ring 8 is engagedly fitted in the groove 43a as shown in FIG. 2. The inner diameter of the O-ring 8 is set to be slightly smaller than the diameter of the groove 43a under a natural state where no load is imposed. The O-ring 8 is formed of material having elasticity such as fluororubber or the like, and it is engagedly fitted in the groove 43a with being expanded. Furthermore, the O-ring 8 is coated with lubricant such as silicon oil or the like.

The left-side cylinder portion 42 of the center cylinder portion 41 has the same structure as the right-side cylinder portion 43, and the O-ring 7 is engagedly fitted in a groove 42a. Like the O-ring 8, the O-ring 7 is coated with lubricant.

The gear portion 44 is equipped to the left end of the left-side cylinder portion 42, and disposed to be coaxial with the center cylinder portion 41. The gear portion 44 has a plurality of gear teeth arranged at a predetermined pitch. Representing the number of the gear teeth of the gear portion 44 by n, the pitch angle is equal to $(360/n)°$.

The first base 9 is disposed at the left side of the rotating member 4, and the second base 10 is disposed at the right side of the rotating member 4. The first base 9 and the second base 10 are fixed to the housing 2.

A circular hole 9a whose axis extends in the right-and-left direction is formed in the first base 9, and the diameter of the circular hole 9a is set to be substantially equal to or slightly larger than that of the left-side cylinder portion 42. The left-side cylinder portion 42 around which the O-ring 7 is engagedly fitted is freely rotatably inserted in the circular hole 9a. Play is provided between the inner surface of the circular hole 9a and the left-side cylinder portion 42, however, no play is provided between the inner surface of the circular hole 9a and the O-ring 7. The O-ring 7 is freely slidable on the inner surface of the circular hole 9a or the outer surface of the groove 43 while sandwiched between the inner surface of the circular hole 9a and the outer surface of the groove 42a.

A circular hole 10a is also formed in the second base 10. The arrangement of the circular hole 10a and the right-side cylinder portion 43 is similar to that of the circular hole 9a and the left-side cylinder portion 42. The edges of the circular holes 9a and 10a are chamfered so that the O-rings 7, 8 are smoothly insertable into the circular holes 9a, 10a.

The rotating member 4 supported by the first base 9 and the second base 10 is disposed so that a part of the outer peripheral surface of the center cylinder portion 41 is exposed from the housing 2 to the outside as shown in FIG. 3. In this embodiment, an upper portion of the outer peripheral surface of the center cylinder portion 41 is set as the portion exposed from the housing 2.

When a fingerprint is read, a person being authenticated softly presses his/her finger 200 against the exposed portion of the outer peripheral surface of the center cylinder portion 41 and moves the finger 200 forwards or backwards to rotate the rotating member 4. In this case, since the O-rings 7, 8 are pinched by the rotating member 4 and the bases 9, 10, the rotating member 4 suffers some rotational resistance. Accordingly, the rotating member 4 does not start any rotational motion unless the person being authenticated applies some degree of torque to the rotational member 4 with his/her finger 200. Furthermore, the rotating member 4 is not rotated more quickly than the movement of the finger 200, that is, the rotating member 4 does not idle relatively to the finger 200.

On the other hand, since the O-rings 7, 8 are coated with lubricant, the O-rings 7, 8 slips on the bases 9, 10 or the rotating member 4. Accordingly, when the person being authenticated rotates the rotating member 4 while pressing the finger 200 against the rotating member 4, the finger 200 does not slip on the center cylinder portion 41.

Since the O-rings 7, 8 coated with lubricant are equipped as described above, the torque applied to the rotating member 4 is stabilized and the rotating member starts its rotational motion with a torque of 10 to 20[g·cm]. It has been experimentally verified that even when any person being authenticated presses the finger 200 against the center cylinder portion 41 of the rotating member 4 while applying load to the finger 200 to the extent that the rotating member 4 is rotated with the degree of torque described above, the skin of the finger 200 is not distorted and further slip hardly occurs between the finger 200 and the rotating member 4.

According to a process of manufacturing the rotating member 4 described above, the center cylinder portion 41 is manufactured, the left-side cylinder portion 42 is joined to the left end of the center cylinder portion 41, the right-side cylinder portion 43 is joined to the right end of the center cylinder portion 41, and then the gear portion 44 is joined to the left end of the left-side cylinder portion 42. Furthermore, according to a process of manufacturing the center cylinder portion 41, it may be considered that the center cylinder portion 41 having the embossed surface formed thereon is directly formed by an injection molding machine. However, some types of molding machines sometimes produce center cylinder portions 41 in which the roughness of the embossed surface is uneven or the embossed surface is sparse.

Therefore, according to this embodiment, a transparent cylinder 41a (see FIG. 9) is first formed, and then an embossed surface is formed on the transparent cylinder 41a, whereby a center cylinder portion 41 having a beautiful embossed surface can be manufactured.

Figure 9:
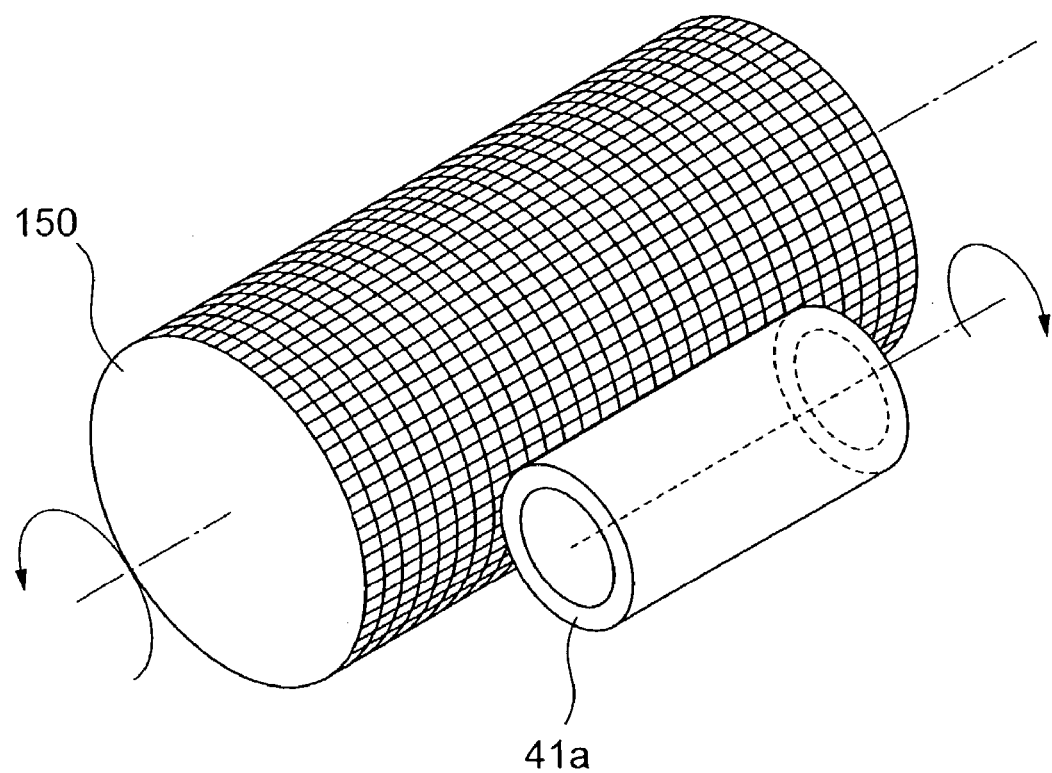
FIG. 9 is a diagram showing a step of manufacturing the rotating member.

That is, transparent resin is subjected to extrusion molding or injection molding to form a transparent cylinder 41a having a very smooth outer peripheral surface. Thereafter, as shown in FIG. 9, the outer peripheral surface of the transparent cylinder 41a is pressed against a transfer roller 150 having the embossed outer peripheral surface. At this time, the transparent cylinder 41a is disposed in parallel to a transfer roller 150. The transfer roller 150 is heated to about 150° C., and the transparent cylinder 41a is rotated by rotating the transfer roller 150 while the transparent cylinder 41a is pressed against the transfer roller 150, whereby the embossed surface of the transfer roller 150 is transferred to the outer peripheral surface of the transparent cylinder 41a. Accordingly, the outer peripheral surface of the transparent cylinder 41a is processed to have a surface like an embossed surface. The transparent cylinder 41a thus embossed becomes the center cylinder portion 41.

Next, the timing clock generator 11 will be described.

Figure 5:
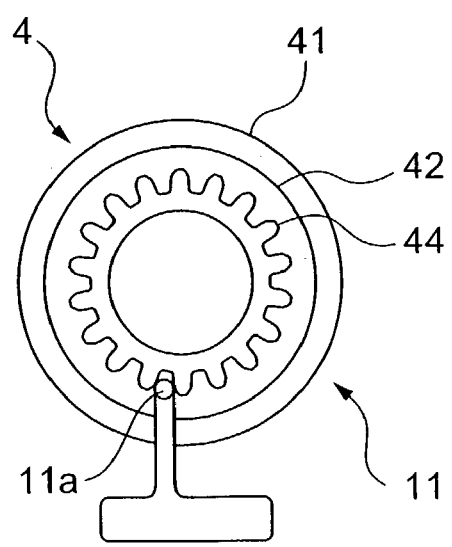
FIG. 5 is a side view of the rotating member.

FIG. 5 is a diagram showing the rotating member 4, which is viewed along the axial direction thereof.

As shown in FIG. 5, the timing clock generator 11 comprises the gear portion 44, an engaging pin 11a, a synchronous signal generating circuit for generating a pulse (synchronous signal) interlockingly with the motion of the engaging pin 11a, or the like. In the circular hole 9a, the engaging pin 11a is engaged in the gap between respective gear teeth in the gear portion 44. The engaging pin 11a is freely swingable or has flexibility, and it is located at a fixed position. The gear teeth of the gear portion 44 are designed to jump across the engaging pin 11a through rotation of the rotating member 4. Here, a pulse is generated by the synchronous signal generating circuit every time a tooth of the gear portion 44 jumps across the engaging pin 11a. Accordingly, a timing clock signal is generated in accordance with the rotation of the rotating member 4. Representing the number of the gear teeth of the gear portion 44 by n, a timing clock signal comprising a train of pulses of n is generated every rotational cycle of the rotating member 4. When the person being authenticated rotates the rotating member 4 by the finger 200, representing the outer diameter of the center cylinder portion 41 by $\phi$, a pulse is generated every time the finger 200 goes ahead by $(\pi \phi \times n/360)$. The timing at which each pulse is generated corresponds to a timing at which a one-dimensional optical image is achieved from the line image sensor 3.

The present invention is not limited to the timing clock generator 11 thus constructed, and an encoder for generating a pulse every time the rotating member 4 is rotated by a predetermined angle may be used.

Figure 6:
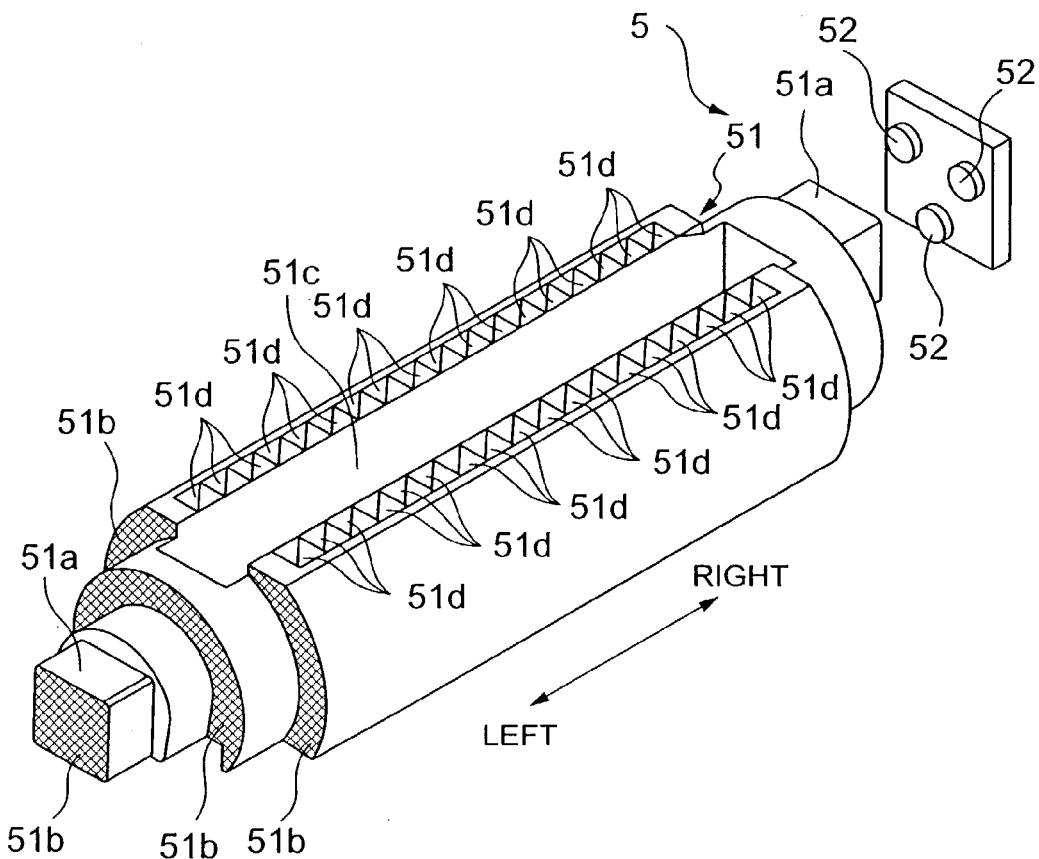
FIG. 6 is a perspective view showing a light irradiator equipped to the image input device.

Next, the light irradiator 5 will be described. FIG. 6 is a perspective view showing the light irradiator 5.

The light irradiator 5 has a light guide 51 disposed inside the rotating member 4, and light emitting elements 52 for emitting light. In FIG. 6, three light emitting elements 52 are equipped, however, the number of the light emitting elements 52 is not limited to three. It may be one, two, four or more.

The light guide 51 is formed of borosilicate glass, quartz glass or other types of glass, or a transparent material such as acrylic resin (PMMA), polycarbonate or other types of resin. The light guide 51 is designed to have such a shape that it is insertable into the rotating member 4 and the rotating member 4 is rotatable around the light guide 51. As described later, the light guide 51 also serves as a holder for holding the line image sensor 3 and the Selfoc lens array 6.

A projection 51a having a rectangular parallelepiped shape is equipped at each of the right and left ends of the light guide 51. A rectangular hole 9b is formed on the bottom of the circular hole 9a of the first base 9, and the left-end projection 51a is engagedly fitted in the rectangular hole 9b. Likewise, a rectangular hole 10b (abbreviated from the illustration) is formed on the bottom of the circular hole 10a of the second base 10, and the right-end projection 51a is engagedly fitted in the rectangular hole 10b. Accordingly, the light guide 51 is fixed to the bases 9, 10 so that it is not rotatable.

The lower portion of the light guide 51 is designed to have such a shape that the line image sensor 3 can be incorporated in the light guide 51. The line image sensor 3 is fixedly fitted at the lower portion of the light guide 51 with the photoreceptive portion 32 thereof placed face up. The optical axis of the line image sensor 3 crosses the rotational axis of the rotating member 4. Accordingly, the normal line of the outer peripheral surface of the center cylinder portion 41 at the contact portion with the finger 200 is substantially overlapped with the optical axis of the line image sensor 3.

An elongated through hole 51c extending in the right-and-left direction is formed in the light guide 51, and the photoreceptive portion 32 of the line image sensor 3 is disposed to face the through hole 51c.

A light reflection mirror 51b is formed on the left-end face of the light guide 51.

A plurality of recesses 51d are formed on the upper surface of the light guide 51. These recesses 51d are arranged in a line just in front of and just behind the through hole 51 so that the lines of the recesses extend in the right-and-left direction along the through hole 51c. Each recess 51d is designed so that the opening thereof is rectangular in section and the bottom thereof is pursed. That is, each recess 51d is designed in a quadrangular pyramid shape.

Figure 7:
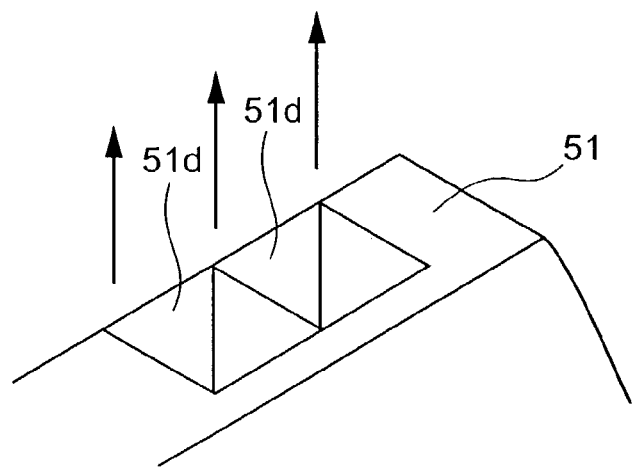
FIG. 7 is an enlarged perspective view of a light guide of the light irradiator.

FIG. 7 is an enlarged view of the upper surface of the light guide 51. As shown in FIG. 7, these recesses 51d bring light propagating through the light guide 51 with upward directivity.

Each of the light emitting elements 52 comprises a self-luminous element such as LED (Light-emitting Diode), organic EL (Electro-luminescence), inorganic EL or the like, and they are basically equipped on a substrate. The light emitting elements 52 are fixed to the bottom of the circular hole 10a of the second base 10 together with the substrate. The light emitting elements 52 are disposed at positions in the right side of the light guide 51 and emit light toward the left side.

The light emitted from the light emitting elements 52 is incident to the right-end face of the light guide 51 and propagates in the light guide 51. The light propagating in the light guide 51 is radiated from the plurality of recesses 51d, and upwardly radially expanded from the upper surface of the light guide 51. The light radiated from the light guide 51 is incident to the exposed portion of the center cylinder portion 41 which is exposed from the housing 2 (that is, to the contact portion of the center cylinder portion 41 with the finger 200). Since the plurality of recesses 51d are arranged along a line parallel to the axis (rotational axis) of the rotating member 4, the light propagating in the light guide 51 is radiated along the lines of the recesses 51d.

Next, the Selfoc lens array 6 will be described.

The Selfoc lens array 6 is an optical system having a number of Selfoc lenses 61 arranged, and it forms a single continuous image by the assembly of a plurality of Selfoc lenses 61.

Each Selfoc lens 61 comprises a column-shaped rod lens, and has a parabolic refractive-index distribution extending from the center axis to the peripheral surface thereof, which has the highest refractive index on the center axis and the lowest refractive index on the peripheral surface. Accordingly, each Selfoc lens 61 has an action which is optically substantially equivalent to a spherical lens. All the Selfoc lenses 61 have the optically equivalent properties. These Selfoc lenses 61 are regularly and precisely arranged between two plates 62, and light shielding material (for example, black silicon resin) is filled in each gap between the respective lenses to remove flare light.

The Selfoc lens array 6 thus constructed is engagedly fitted and fixed in the through hole of the light guide 51. The center axis of each Selfoc lens 61 extends in the up-and-down direction, and the lower end face thereof faces the photoreceptive portion 32 while the upper end face thereof faces the exposed portion of the center cylinder portion 41. Each Selfoc lens 61 forms an erect unmagnified image. That is, each Selfoc lens 61 forms on the photoreceptive portion 32 an image appearing on the outer peripheral surface of the center cylinder portion 41 which is exposed from the housing 2. At this time, the image formed on the photoreceptive portion and the image on the outer peripheral surface of the center cylinder portion 41 are in unmagnified relationship with each other, and also there is no difference in orientation between these images, that is, there occurs no image inversion. Accordingly, the Selfoc lens array 6 forms the image appearing on the outer peripheral surface exposed from the housing 2 at the center cylinder portion 41 onto the photoreceptive portion 32 in the erect-unmagnification mode by the assembly of a plurality of Selfoc lenses 61. Since the Selfoc lens array 6 forms an erect-unmagnified image, it is unnecessary to incorporate a reversing mirror in the rotating member 4, and thus the diameter of the rotating member 4 can be reduced to about 7 mm, for example.

Figure 8:
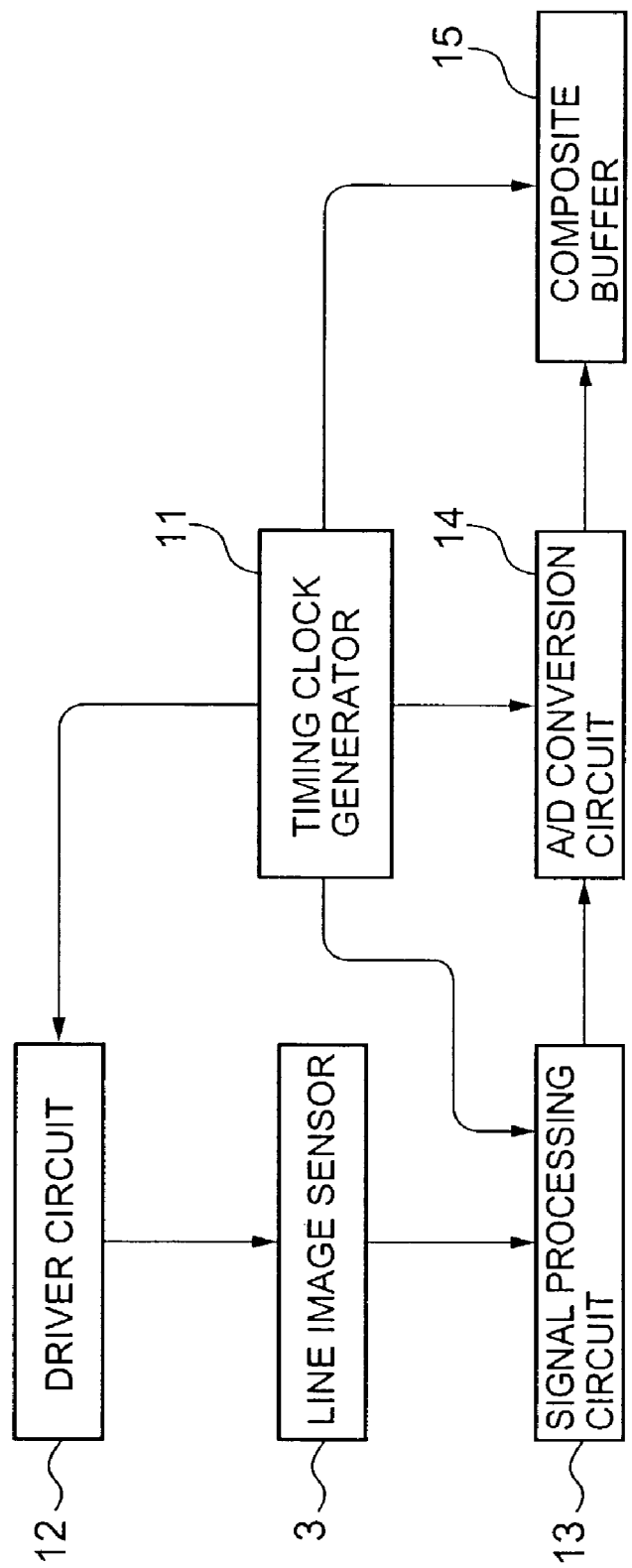
FIG. 8 is a block diagram showing the circuit construction of the image input device.

Next, the circuit system of the image input device 1 will be described with reference to FIG. 8.

The timing clock generator 11 (actually, the synchronous signal generator of the timing clock generator) outputs the timing clock signal to a driver circuit 12, a signal processing circuit 13, an A/D conversion circuit 14 and a composite buffer 15, and these circuits 12 to 15 are operated in synchronism with the timing clock signal thus input.

The driver circuit 12 drives the line image sensor 3 on the basis of the timing clock signal, whereby each photoelectric conversion element of the line image sensor 3 has an electrical characteristic conformed with the amount of incident light, the line image sensor 3 achieves a one-dimensional optical image as an electrical signal, and the electrical signal thus achieved is output from the line image sensor 3 to the signal processing circuit 13. The signal processing circuit 13 processes the electrical signal input from the line image sensor 3 to detect the level of the electrical signal. The A/D conversion circuit 14 converts the level of the electrical signal to a digital signal, and outputs it as one-dimensional optical image data to the composite buffer 15. One-dimensional optical image data are sequentially combined with one another in the composite buffer 15 to generate two-dimensional optical image data. The two-dimensional image data generated in the composite buffer 15 are output to a computer to be supplied for the processing of the computer (for example, the personal authentication processing).

The way how to use the image input device 1 thus constructed and the operation of the image input device 1 will be described.

When a person being authenticated presses his/her finger 200 against the center cylinder portion 41 and moves the finger 200 forwards or backwards, the rotating member 4 is rotated. During the rotation of the rotating member 4, the contact portion between the finger 200 and the center cylinder portion 41 is shifted.

At this time, light emitted from the light emitting elements 52 propagates in the light guide 51, and the light thus propagating is upwardly irradiated from each recess 51d to the finger 200.

Here, at the contact portion between the finger 200 and the center cylinder portion 41, convex portions of the fingerprint are in close contact with the outer peripheral surface of the center cylinder portion 41 while concave portions of the fingerprint are away from the outer peripheral surface of the center cylinder portion 41.

With respect to the convex portions of the fingerprint which are in close contact with the outer peripheral surface of the center cylinder portion 41, the irradiation light is incident to the convex portions through the center cylinder portion 41 with high intensity. The light reflected from the convex portions of the fingerprint is incident through the Selfoc lens array 6 to the line image sensor 3 while being hardly reduced in intensity by the outer peripheral surface of the center cylinder portion 41.

On the other hand, with respect to the concave portions of the fingerprint, the irradiation light is diffused on the outer peripheral surface because the concave portions of the fingerprint are away from the outer peripheral surface of the center cylinder portion 41, and thus it is hardly incident to the concave portions of the fingerprint. In addition, the reflection light reflected from the concave portions of the fingerprint is also incident to the outer peripheral surface of the center cylinder portion 41, however, it is diffused on the outer peripheral surface of the center cylinder portion 41. Accordingly, the reflection light of the concave portions of the fingerprint is not incident to the line image sensor 3. Particularly since the outer peripheral surface of the center cylinder portion 41 is embossed, the difference in intensity of the reflection light from the convex portions and concave portions of the fingerprint appears remarkably.

Accordingly, the reflection light whose intensity is conformed to the fingerprint pattern of the finger 200 is incident to the line image sensor 3, and the fingerprint pattern of the finger 200 is imaged on the line image sensor 3 by the Selfoc lens array 6.

As described above, when the personal being authenticated presses the finger 200 against the center cylinder portion 41 and rotates the rotating member 4, the finger 200 of the person being authenticated is successively linearly scanned by the line image sensor 3. The line image sensor 3 achieves an unevenness image of the fingerprint a one-dimensional optical image every time it linearly scans the finger 200 in synchronism with the timing clock, and the one-dimensional optical image data of the fingerprint are sequentially combined in the composite buffer 15. As the sequential composition of the one-dimensional optical image data of the fingerprint progresses, the two-dimensional optical image data of the fingerprint is being generated in the composite buffer 15.

A pattern (which is broadly defined to cover characters, numerals, pictures, or the like.) appearing on the surface of a smooth and flat subject such as a sheet having no such irregularities as the finger 200 can be achieved as a two-dimensional optical image by the image input device 1 according to this embodiment. In this case, since the subject is brought into close contact with the center cylinder portion 41, light which is incident from the light guide 51 to the subject and then reflected from the subject is hardly reduced in intensity on the outer peripheral surface of the center cylinder portion 41. Accordingly, the subject is scanned by the line image sensor 3, and a pattern on the surface of the subject is achieved as one-dimensional optical image data by the line image sensor 3. When the one-dimensional optical image data of the pattern of the subject are sequentially combined, the two-dimensional optical image data of the pattern is generated in the composite buffer 15.

The two-dimensional optical image generated in the composite buffer 15 also becomes an unmagnified image. This is because the Selfoc lens array 6 forms an unmagnified image on the photoreceptive portion 32. That is, in the process of generating a two-dimensional optical image in the composite buffer 15, an unmagnified two-dimensional optical image can be generated without correcting the image in the direction perpendicular to the one-dimensional optical image.

The present invention is not limited to the above embodiment, and various improvements and changes in design may be made to the embodiment without departing from the subject matter of the present invention.

For example, in the above embodiment, the outer peripheral surface of the center cylinder portion 41 is set to the embossed surface to diffuse light on the outer peripheral surface of the center cylinder portion 41. However, light may be diffused on the outer peripheral surface of the center cylinder portion 41 by using another section. For example, powder glass beads may be uniformly sprayed to the outer peripheral surface of a center cylinder portion 41 whose outer peripheral surface is flat and smooth, thereby roughening the outer peripheral surface of the center cylinder portion 41. Furthermore, the outer peripheral surface of a center cylinder portion 41 whose outer peripheral surface is flat and smooth may be polished with abrasive material, filter paper or the like, thereby roughening the outer peripheral surface of the center cylinder portion 41, or a light diffusion sheet material may be attached to the outer peripheral surface of a center cylinder portion 41 whose outer peripheral surface is flat and smooth.

In the above embodiment, the Selfoc lens array 6 is fixed in the through hole 51c. However, an optical lens or optical lens group (for example, spherical lens, aspherical lens or the like) may be fixed in the through hole 51c so that the outer peripheral surface of the center cylinder portion 41 is set as an object point and the photoreceptive portion 32 is set as an imaging plane.

[Second Embodiment]

There are some requirements for making the image input device more compact when the image input device is installed in portable electronic equipment, and in order to satisfy the requirements, the rotating member (transparent roller) must be miniaturized. However, the Selfoc lenses and the outer peripheral surface or the photoreceptive portion of the line image sensor must be kept to be spaced from each other at a distance dependent on the focus distance of the Selfoc lenses. Furthermore, there is a limit to reduction of the focus distance of the Selfoc lenses. Therefore, the structure of an image input device that enables a lens optical system and an image pickup device to be accommodated in a more compact transparent roller without reducing the focus distance of the Selfoc lenses will be described by using the following second to eighth embodiments.

Figure 10:
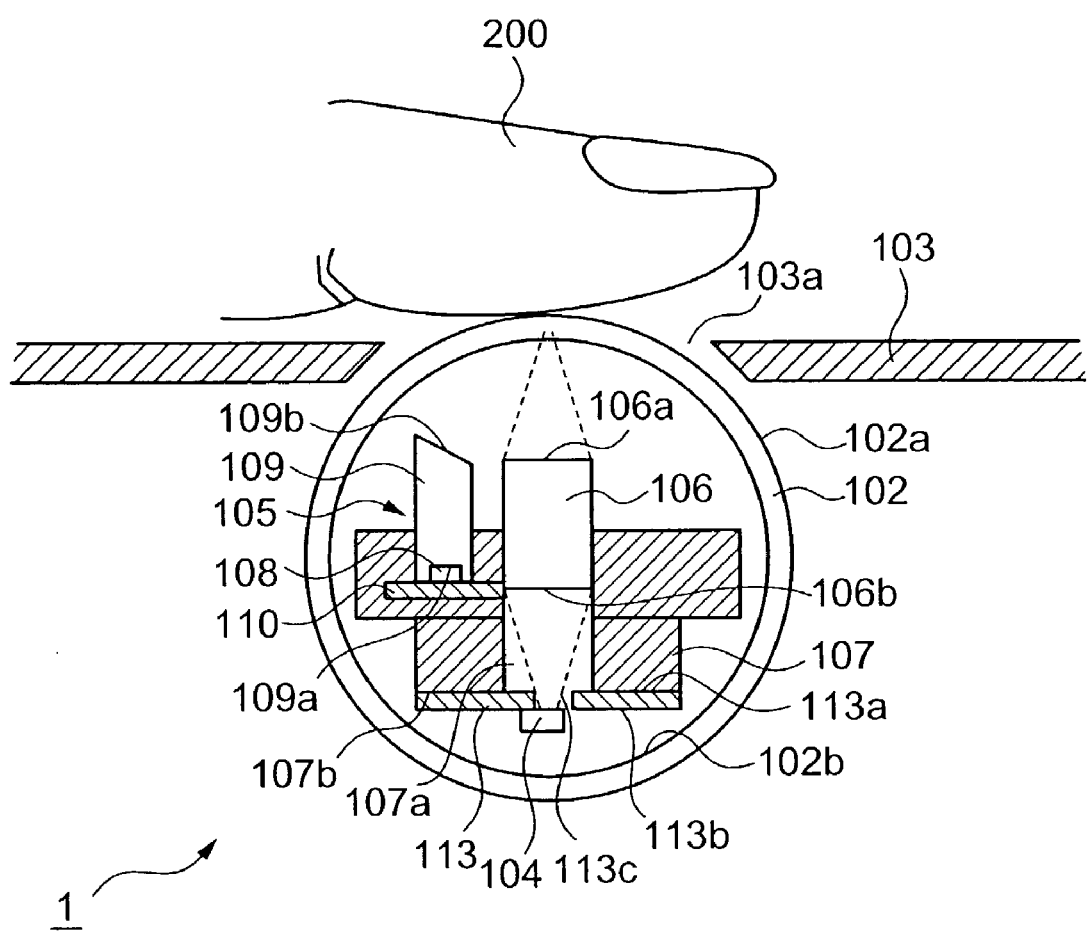
FIG. 10 is a cross-sectional view showing an image input device according to a second embodiment.

FIG. 10 is a cross-sectional view showing an image input device 1 according to a second embodiment.

A rotating member (hereinafter referred to as "rotating roller") 102 of the image input device 1 is designed to have a transparent cylindrical shape, and the material and structure thereof are substantially the same as the first embodiment.

The rotating roller 102 is accommodated in a housing 103, and a part of the outer peripheral surface 102a of the rotating roller 102 is exposed from an image pickup window 103a formed in the housing 103 so as to slightly project from the image pickup window 103a to the outside of the housing 103. When the finger 200 is moved forwards or backwards (that is, in the tangent direction at the contact portion of the outer peripheral surface 102a of the rotating roller 102 with the finger 200) under the state that the finger 200 is pressed against the outer peripheral surface 102a of the rotating roller 102 at the image pickup window 103a, the rotating roller 102 is rotated around the rotational axis thereof.

In the hollow of the rotating roller 102 are disposed a one-dimensional image pickup element 104 (line image sensor) for picking up a one-dimensional image of the finger 200 which is kept in contact with the outer peripheral surface 102 of the rotating roller 102, a light irradiator 105 for emitting light to the image pickup window 103a and irradiate light through the image pickup window 103a to the finger 200, and a Selfoc lens array 106 for forming a one-dimensional image of the finger 200 on the one-dimensional image pickup element 104. Furthermore, a holder 107 is disposed in the hollow of the rotating roller 102, and the one-dimensional image pickup element 104, the light irradiator 105 and the Selfoc lens array 106 are mounted in the holder 107.

The holder 107 extends from one end or both the ends of the rotating roller 102 to the outside of the hollow and is fixed to the housing 103 or the like. Therefore, the holder 107 is supported so that it is not rotated even when the rotating roller 102 is rotated. A light path hole 107a is formed in the holder 107 so as to penetrate through the holder 107 in a direction which is substantially perpendicular to the rotational axis of the rotating roller 102, and the image pickup window 103a is located on an extension in the penetrating direction of the light path hole 107a. The Selfoc lens array 106 is engagedly fitted in the light path hole 107a formed in the holder 107, whereby the Selfoc lens array 106 is fixed in the holder 107.

The Selfoc lens array 106 have the same structure as the lens array 6 of the first embodiment, and thus the description thereof is omitted. The optical axis of the Selfoc lens array 106 crosses the rotational axis of the rotating roller 102. The light-incident face 106a of the Selfoc lens array 106 is oriented to the image pickup window 103a, and the optical axis of the Selfoc lens array 106 crosses the rotating roller 102 within the image pickup window 103a.

The light irradiator 105 is equipped with a light emitting element 108 and a light guide prism 109. The light emitting element 108 comprises a self-luminous element such as LED (Light-emitting Diode), organic EL (Electro-luminescence), inorganic EL, a fluorescent lamp or the like, and it is equipped on a substrate. The substrate 110 and the light emitting element 108 are mounted in the holder 107 behind the Selfoc lens array 106.

The light guide prism 109 is fitted in the holder 107 and equipped on the substrate 10 so as to cover the light emitting element 108. The light-incident face 109a of the light guide prism 109 faces the light emitting element 108, and the light-emission face 109 of the light guide prism 109 faces the cross portion between the rotating roller 102 and the optical axis of the Selfoc lens array 106. The light-emission face 109b of the light guide prism 109 is designed to be elongated in the right-and-left direction along the rotating roller 102. The light guide prism 109 is designed so that light emitted from the light emitting element 108 is incident from the light-incident face 109a, the incident light is made to propagate to the light emission face 109b and then the light thus propagating is emitted from the light-emission face 109b to the image pickup window 103a. The finger 200 is irradiated with the emission light having a band-like shape extending in parallel to the rotational axis of the rotating roller 102.

As shown in FIG. 11, the one-dimensional image pickup element 104 has a silicon substrate 120, a photoreceptive portion 111 for detecting light and bonding pads 112 for inputting/outputting electrical signals from/to the photoreceptive portion 111, the photoreceptive portion 111 and the bonding pads 112 being formed on the substrate 120. The photoreceptive portion 111 comprises a plurality of photoelectric conversion elements for outputting the electrical signals corresponding to the intensity of incident light (or the light amount of incident light) which are arranged in the right-and-left direction (that is, in parallel to the rotational axis of the rotating roller 102). A CCD image sensor, a CMOS image sensor, a semiconductor device formed of amorphous silicon or the like may be used as the photoelectric conversion elements.

The one-dimensional image pickup element 104 is mounted on a film substrate 113 in the COF (Chip On Film) system. The film substrate 113 is fixed to the lower surface 107b of the holder 107 so as to close the light path hole 107a of the holder 107. The film substrate 113 is disposed in the direction perpendicular to the optical axis of the Selfoc lens array 106 so that the surface 113a thereof faces the light-emission face 106b of the Selfoc lens array 106. A through hole 113c is formed in the film substrate 113 so as to penetrate from the surface 113a of the film substrate 113 to the back surface 113b thereof. When viewing the film substrate 113 in the direction perpendicular to the film substrate 113, the through hole 113c has a rectangular shape elongated in the direction of the rotational axis of the rotating roller 102. Furthermore, the through hole 113 faces the light path hole 107a, and the film substrate 113 is disposed so that the optical axis of the Selfoc lens array 106 passes through the through hole 113c.

The back surface 113b of the film substrate 113 is wired, and on the terminals of the wires, bumps 114 made of metal or alloy of solder, gold or the like are formed. The one-dimensional image pickup element 104 is mounted on the back surface 113b of the film substrate 113. Specifically, the bonding pads 112 of the one-dimensional image pickup element 104 are joined to the terminals of the wires through the bumps 114, whereby the one-dimensional image pickup element 104 is fixed to the back surface 113b of the film substrate 113. The photoreceptive portion 111 of the one-dimensional image pickup element 104 faces the through hole 113c, and the optical axis of the Selfoc lens array 106 passes through the through hole 113c and reaches the photoreceptive portion 111.

Here, the Selfoc lens array 106 forms on the photoreceptive portion 111 an erect unmagnified image corresponding to an image appearing on the outer peripheral surface 102a of the rotating roller 102 by the whole of a plurality of Selfoc lenses.

This design can reduce the thickness of the optical system by the amount corresponding to the thickness of the film substrate 113, and thus the diameter of the rotating roller 102 can be further miniaturized.

[Third Embodiment]

Next, another image input device 121 different from the image input device 1 will be described with reference to FIG. 12. With respect to the image input device 121, the same constituent elements as the image input device 1 are represented by the same reference numerals, and the detailed description thereof is omitted.

Figure 12:
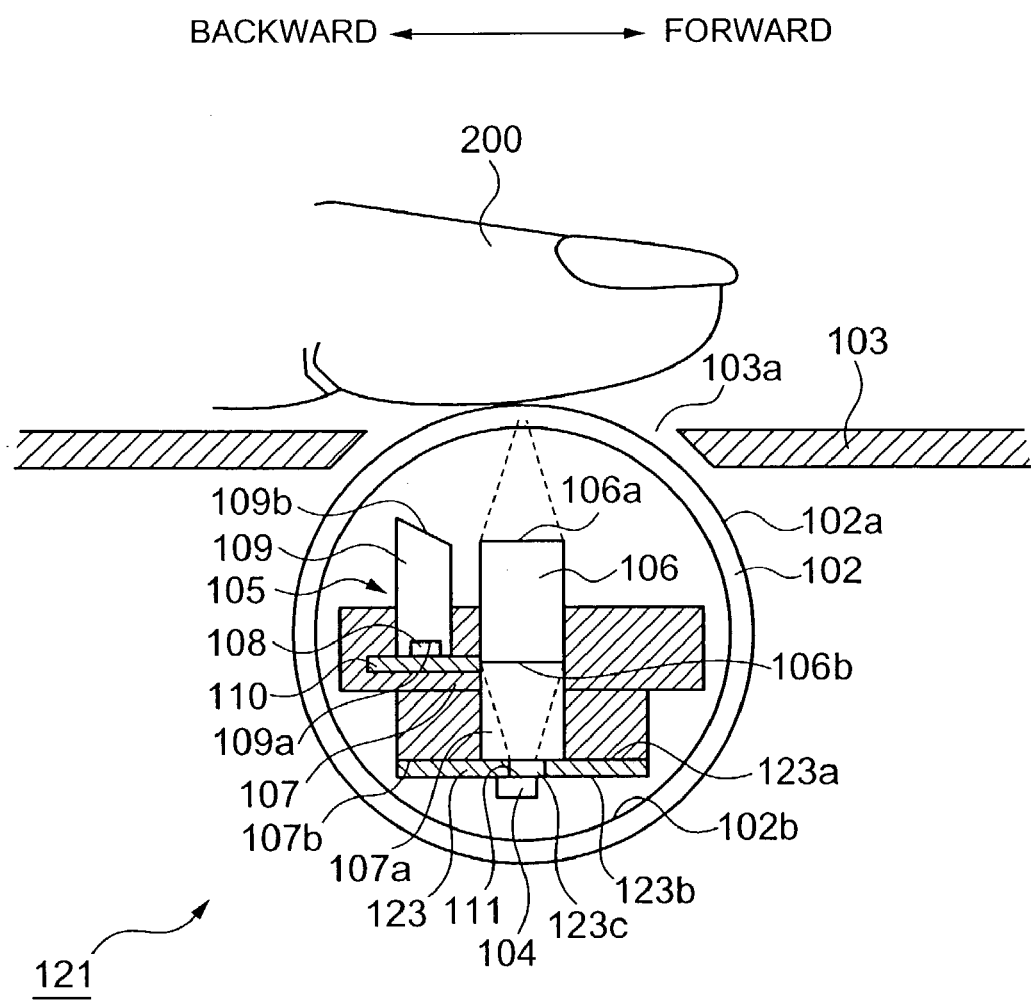
FIG. 12 is a cross-sectional view showing an image input device according to a third embodiment.

The image input device 121 shown in FIG. 12 is equipped with a film substrate 123 in place of the film substrate 113 shown in FIG. 10. The film substrate 123 differs from the film substrate 113 in that no through hole is formed in the film substrate 123 whereas the through hole 113c is formed in the film substrate 113. In place of the through hole 113c, the portion corresponding to the through hole 113c in the substrate 123 comprises a transparent portion 123c through which light is transmissible.

That is, the film substrate 123 is designed so that the cross portion thereof to the optical axis of the Selfoc lens array 106 comprises the transparent portion 123 through which light is transmitted, but light is shielded at the other portion. The back surface 123b of the film substrate 123 is wired, and the terminals of the wires thus formed and bonding pads 112 are joined to one another by bumps 114, whereby the one-dimensional image pickup element 104 is mounted on the back surface 123b of the film substrate 123. Since no through hole is formed in the film substrate 123, the overall one-dimensional image pickup element 104 is supported on the back surface 123b of the film substrate 123, and this makes it easy to mount the one-dimensional image pickup element 104 on the back surface 123b of the film substrate 123.

[Fourth Embodiment]

Next, another image input device 131 different from the image input device 1 will be described with reference to FIG. 13. With respect to the image input device 131, the same constituent elements as the image input device 1 of the second embodiment are represented by the same reference numerals, and the detailed description thereof is omitted.

Figure 13:
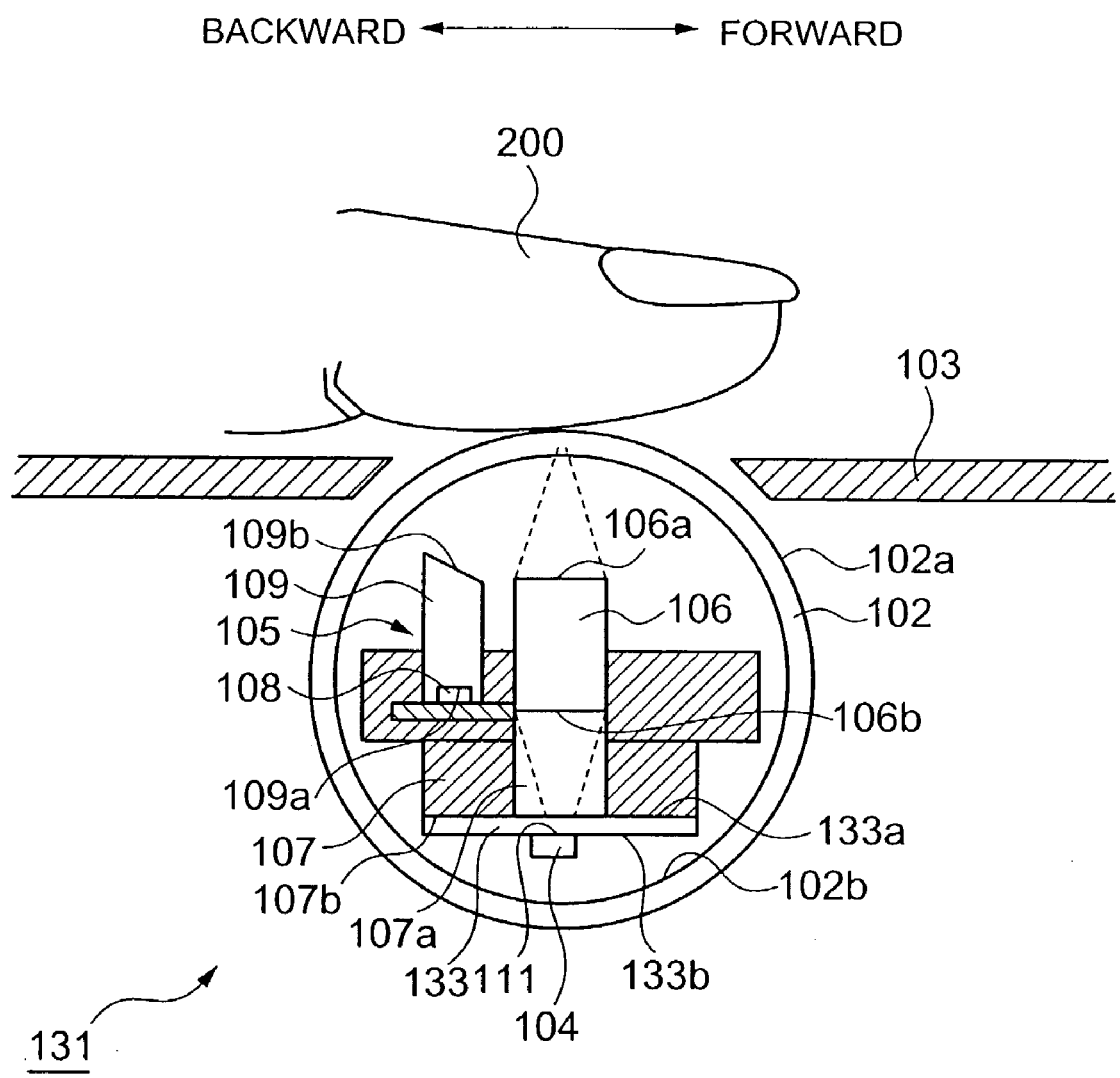
FIG. 13 is a cross-sectional view showing an image input device according to a fourth embodiment.

The image input device 131 shown in FIG. 13 is equipped with a film substrate 133 in place of the film substrate 113 shown in FIG. 10. The film substrate 133 differs from the film substrate 113 in that no through hole is formed in the film substrate 133 whereas the through hole 113c is formed in the film substrate 113, however, the film substrate 133 is designed so that the whole body thereof is transparent to make light transmissible therethrough.

[Fifth Embodiment]

Next, another image input device 141 different from the image input device 1 will be described with reference to FIG. 14. With respect to the image input device 141, the same constituent elements as the image input device of the second embodiment are represented by the same reference numerals, and the detailed description thereof is omitted.

Figure 14:
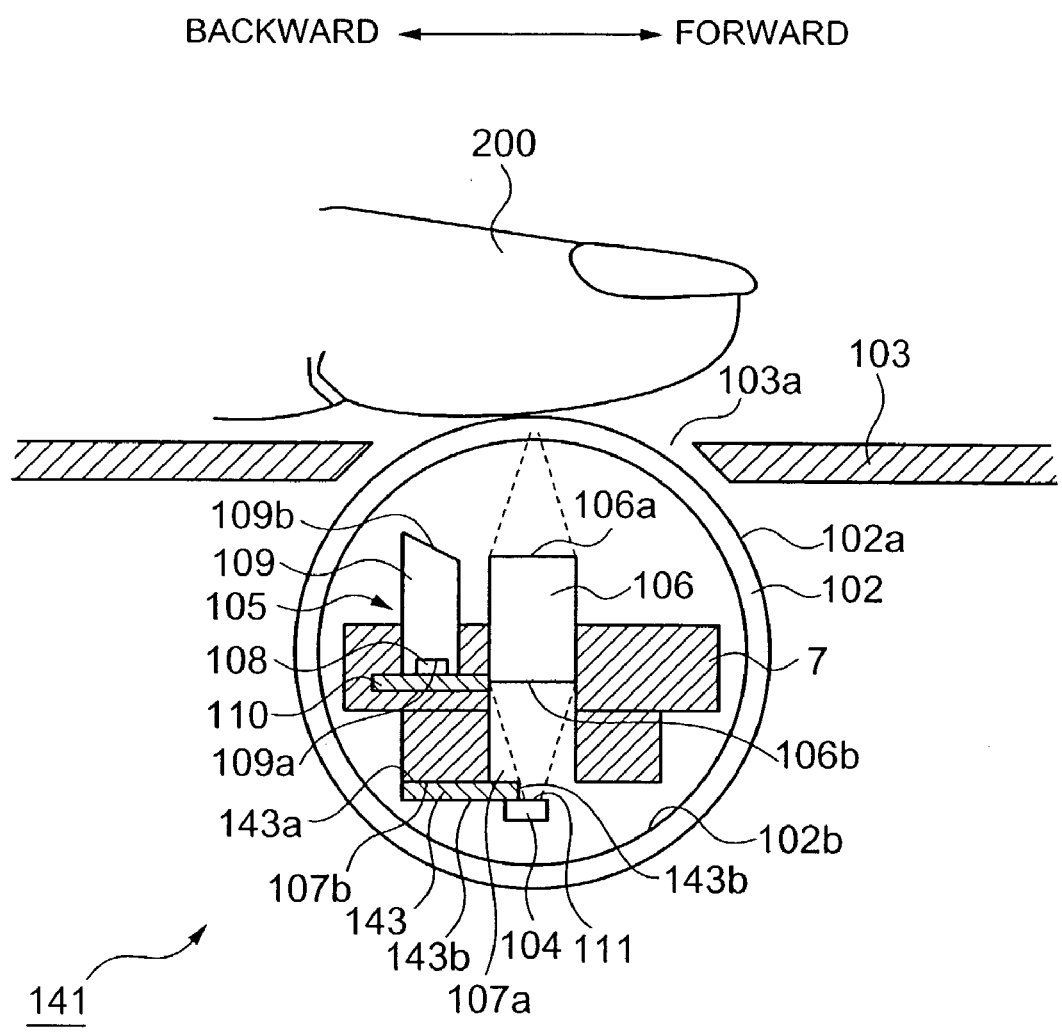
FIG. 14 is a cross-sectional view showing an image input device according to a fifth embodiment.

The image input device 141 shown in FIG. 14 is equipped with a film substrate 143 in place of the film substrate 113. The film substrate 143 is mounted at the rear side on the lower surface 107b of the holder 107, and extends forward into the light path hole 107a. The back surface 143b of the film substrate 143 is wired, and the terminals of the wires are joined to the bonding pads by the bumps 114, whereby the one-dimensional image pickup element 104 is mounted at the front edge portion on the back surface 143b of the film substrate 143.

The photoreceptive portion 111 of the one-dimensional image pickup element 104 extends forward from the front edge 143c of the film substrate 143, and the optical axis of the Selfoc lens array 106 reaches the photoreceptive portion 111 without passing through the film substrate 143.

[Sixth Embodiment]

Next, another image input device 151 different from the image input device will be described with reference to FIG. 15. The image input device 151 is equipped with a rotating roller 102, a housing 103, a Selfoc lens array 106 as an optical system and a light irradiator 105.

The rotating roller 102, the Selfoc lens array 106 and the light irradiator 105 are similar to those of the image input device 1 shown in FIG. 10. Therefore, they are represented by the same reference numerals and the detailed description thereof is omitted. The light irradiator 105 and the Selfoc lens array 106 are fixedly mounted in a holder (not shown) so that they are not rotated.

The image input device 151 is equipped with a rectangular prism as a reflecting optical system, and the rectangular prism 157 is fixed in the rotating roller 102. The rectangular prism 157 is a triangle pole type prism and the ridge angle 157a thereof is a right angle. The light-incident face 157b facing the ridge angle 157a is confronted to the light-emission face 106b of the Selfoc lens array 106 so as to be in parallel to the light-emission face 106b.

Light which is emitted from the light-emission face 106b of the Selfoc lens array 106 and incident to a light-incident face 157b propagates in the rectangular prism 157, and is incident to a face 157c. The light incident to the face 157c is totally reflected in the forward direction from the face 157c, and then incident to a face 157d. The light incident to the face 157d is totally reflected from the face 157d in the opposite direction to the light emitted from the Selfoc lens array 106, and emitted from the light-incident face 157b. That is, the rectangular prism 157 bends the optical axis of the Selfoc lens array 106 by 45° on the face 157c, and further refracted by 45° on the face 157d, whereby light is emitted from the light-incident face 157b substantially in parallel to, but in the opposite direction to the optical axis of the Selfoc lens array 106.

Furthermore, the image input device 151 is equipped with the one-dimensional image pickup element 154. The one-dimensional image pickup element 154 has a silicon substrate 10, bonding pads and a photoreceptive portion as in the case of the one-dimensional image pickup element 104 of the second embodiment. The one-dimensional image pickup element 154 is mounted on the back surface 153b of the substrate 153, however, it is mounted on the substrate 153 in a wire bonding system unlike the one-dimensional image pickup element 104 mounted in the COF system.

The substrate 153 and the one-dimensional image pickup element 154 are disposed in the rotating roller 102, and fixed in front of the Selfoc lens array 106. The back surface 153b of the substrate 153 and the photoreceptive portion of the one-dimensional image pickup element 154 are confronted to the light-incident face 157b of the rectangular prism 157.

The light emitted from the light-emission face 106b of the Selfoc lens array 106 is totally reflected from the face 157c and the face 157d and then emitted from the light-incident face 157b, and the optical axis of the light emitted from the light-incident face 157b crosses the photoreceptive portion of the one-dimensional image pickup element 154. Accordingly, the one-dimensional image pickup element 154 detects the light emitted from the light-incident face 157b of the rectangular prism 157 by the photoreceptive portion.

The Selfoc lens array 106 forms an image appearing on the outer peripheral surface 102a of the rotating roller 102 through the faces 157c and 157d on the photoreceptive portion of the one-dimensional image pickup element 154, and the one-dimensional image pickup element 154 picks up the image thus formed by the photoreceptive portion.

[Seventh Embodiment]

Figure 16:
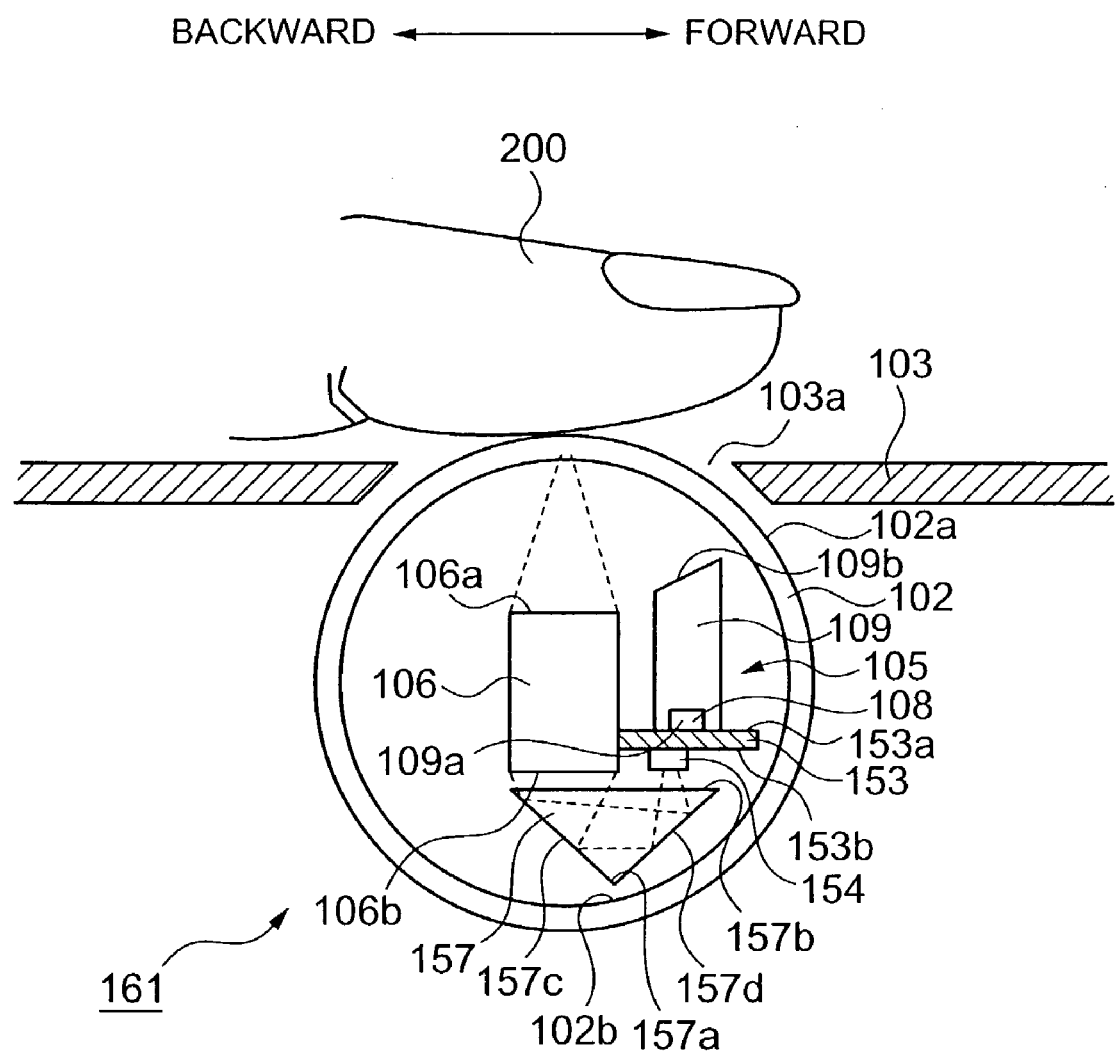
FIG. 16 is a cross-sectional view showing an image input device according to a seventh embodiment.

Next, another image input device 161 different from the image input device 151 will be described with reference to FIG. 16.

The image input device 161 is equipped with a light irradiator 105, and the light irradiator 105 is mounted on the surface 153a of the substrate 153. That is, the light emitting element 108 is mounted on the surface 153a of the substrate 153, and a light guide prism 109 is equipped so as to cover the light emitting element 108. The light-emission face 109b of the light guide prism 109 is oriented to the cross portion between the rotating roller 102 and the optical axis of the Selfoc lens array 106. Therefore, light emitted from the light emitting element 108 propagates in the light guide prism 109, and is emitted from the light-emission face 109b to a subject such as a finger 200 or the like. Furthermore, a circuit for driving the light emitting element 108, or the like are equipped on the substrate 153.

[Eighth Embodiment]

Figure 17:
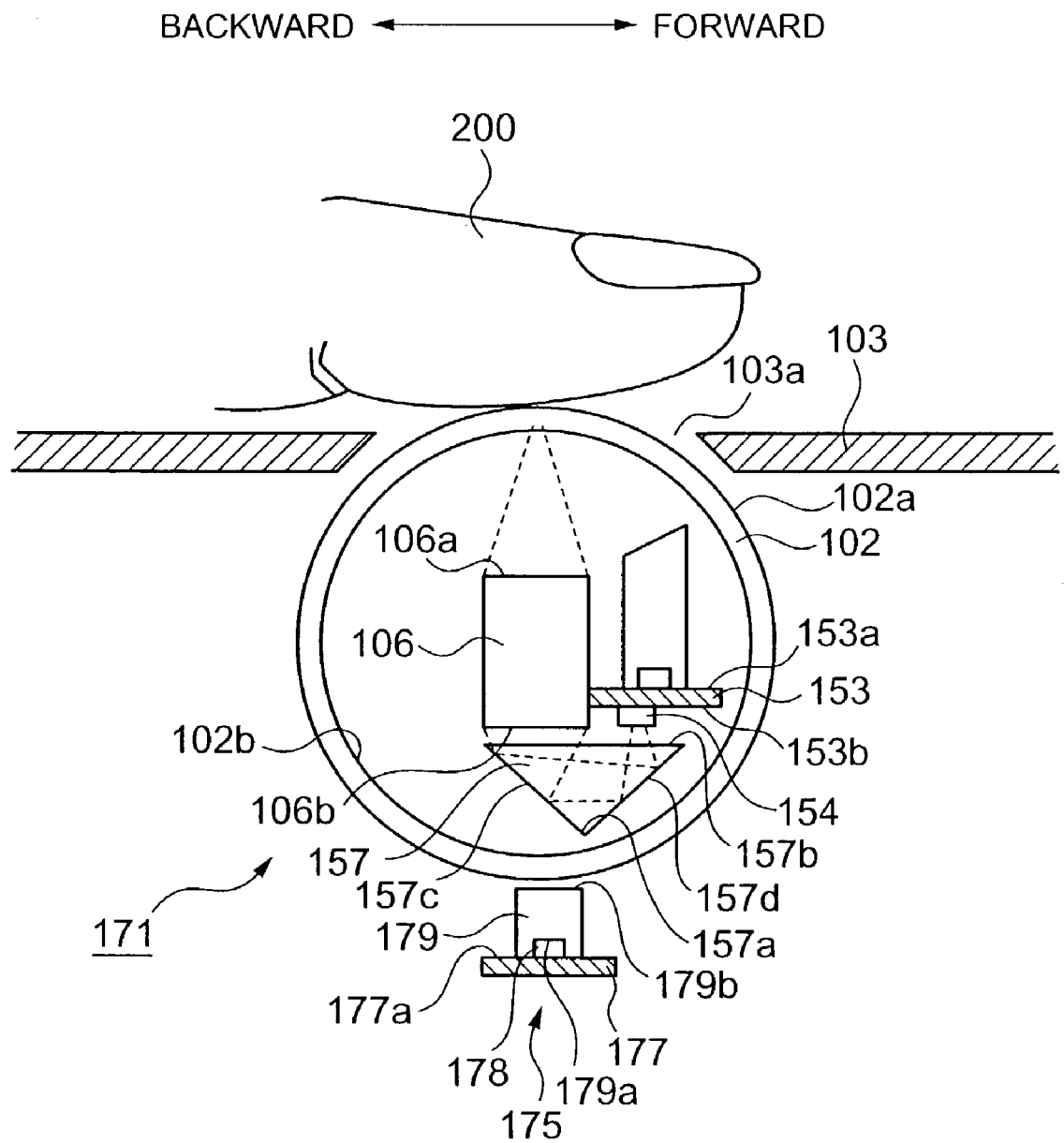
FIG. 17 is a cross-sectional view showing an image input device according to an eighth embodiment.

Next, another image input device 171 different from the image input device will be described with reference to FIG. 17.

Figure 15:
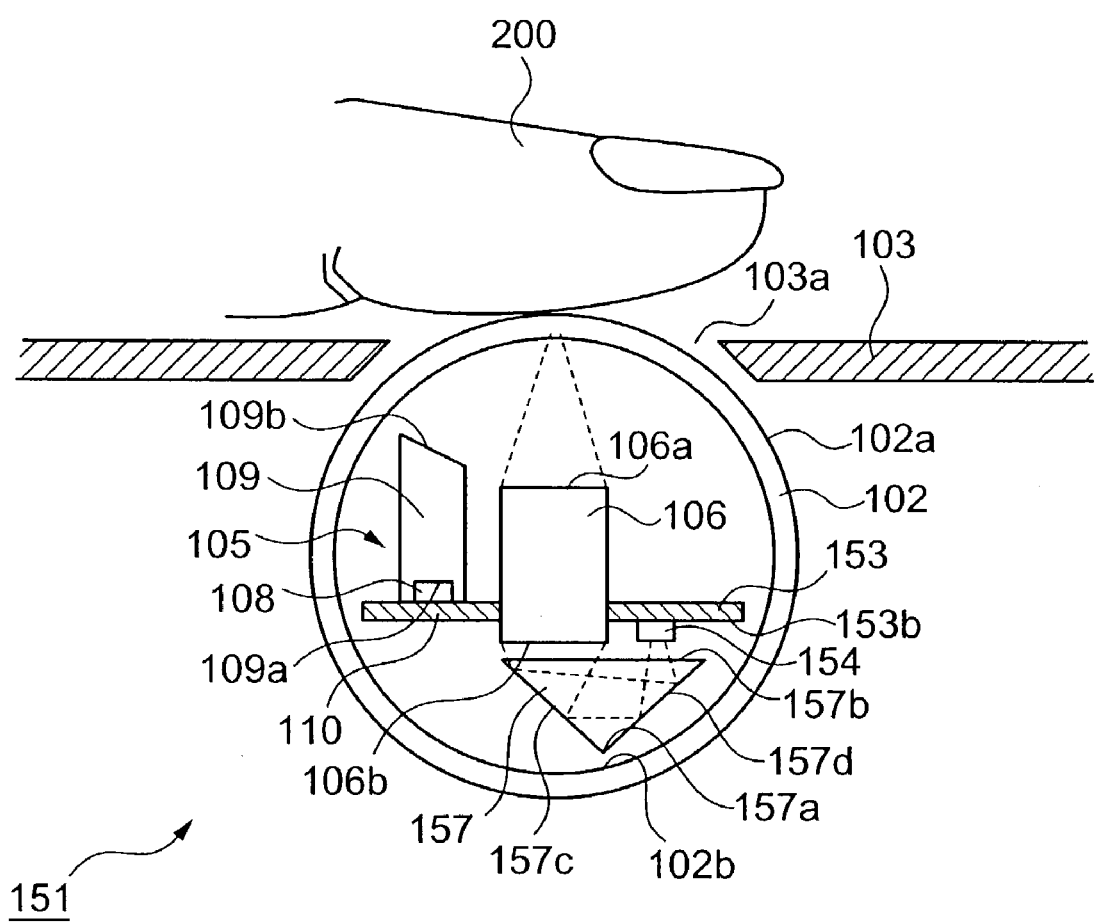
FIG. 15 is a cross-sectional view showing an image input device according to a sixth embodiment.

In the image input device 151, the light irradiator 105 is disposed inside the rotating roller 102 as shown in FIG. 15. On the other hand, in the image input device 171, a light irradiator 175 is disposed out of the rotating roller 102 as shown in FIG. 17. Described in more detail, the light irradiator 175 is equipped with a light emitting element 178 and a light guide prism 179, and the light emitting element 178 and the light guide prism 179 are mounted on a substrate 177 which is disposed in the housing 103 and out of the rotating roller 102.

A surface 177a of the substrate 177 faces the light-emission face 106b of the Selfoc lens array 106, and the rotating roller 102 and the rectangular prism 157 are disposed between the surface 177a of the substrate 177 and the light-emission face 106b of the Selfoc lens array 106.

The light guide prism 179 is designed so that light emitted from the light emitting element 178 is incident to the light-incident face 179a, the incident light is allowed to propagate to the light-emission face 179b and then the light is emitted from the light-emission face 179b. The light emitted from the light-emission face 179b is incident through the rotating roller 102 to the face 157c of the rectangular prism 157 in the direction opposite to the optical axis of the Selfoc lens array 106, propagates in the rectangular prism 157, and then is emitted from the light-incident face 157b. The light emitted from the light-incident face 157b is incident to the light-emission face 106b of the Selfoc lens array 106, propagates in the Selfoc lens array 106 and then is emitted from the light-incident face 106a of the Selfoc lens array 106. The light emitted from the light-incident face 106a of the Selfoc lens array 106 is incident to the rotating roller 102 so as to be converged to the cross portion between the optical axis of the Selfoc lens array 106 and the rotating roller 102, whereby the light is irradiated to the finger 200 pressed against the outer peripheral surface 102a of the rotating roller 102 within the image pickup window 103a.

As in the case of the image input device 151 of the fifth embodiment, the image input device 171 bends the optical axis of the rectangular prism 157, whereby the inner space of the rotating roller 102 can be effectively used for the optical path from the light-emission face 106b of the Selfoc lens array 106 to the one-dimensional image pickup element 154.

The present invention is not limited to the above-described embodiments, and various improvements and changes in design may be made without departing from the subject matter of the present invention.

For example, in the second to fifth embodiments, a non-film type print circuit board (for example, a plastic board, a glass board, a ceramic board or the like) may be used in place of the film substrates 113, 123, 133 and 143.

Furthermore, in the second to eighth embodiments, a rod lens array comprising a plurality of rod lenses arranged in the form of an array, a spherical lens or other types of lenses may be used in place of the Selfoc lens array 106.

What is claimed is:

1. An image input device comprising:
a transparent cylinder supported so as to be freely rotatable around a rotational axis thereof;
a one-dimensional image pickup element disposed in the cylinder; and
an optical system which is disposed in the cylinder and which forms an image of a subject coming into contact with an outer peripheral surface of the cylinder on the one-dimensional image pickup element;
wherein the one-dimensional image pickup element includes a photoreceptive portion comprising photoelectric conversion elements arranged in a line on a silicon substrate, and the silicon substrate is mounted on a back surface of a film substrate having a surface facing the optical system so that the photoreceptive portion receives light emitted from the optical system; and
wherein bonding pads for inputting/outputting electrical signals are mounted on a surface of the silicon substrate on which the photoreceptive portion is provided, bumps serving as terminals of wires are provided on the back surface of the film substrate, and the bonding pads and the bumps are joined to one another to fix the one-dimensional image pickup element to the film substrate.

2. The image input device according to claim 1, wherein the film substrate has a through hole at a position corresponding to an optical axis of the optical system, and the one-dimensional image pickup element is disposed at the through hole so that the photoreceptive portion is located at the position corresponding to the optical axis.

3. The image input device according to claim 1, wherein the film substrate comprises a transparent portion at a position corresponding to an optical axis of the optical system, and the one-dimensional image pickup element is disposed at the transparent portion so that the photoreceptive portion is located at the position corresponding to the optical axis.

4. The image input device according to claim 1, wherein all of the film substrate is transparent, and the one-dimensional image pickup element is disposed so that the photoreceptive portion is located at a position corresponding to an optical axis of the optical system.

5. The image input device according to claim 1, wherein the silicon substrate of the one-dimensional image pickup element is mounted on the back surface of the film substrate such that the photoreceptive portion extends from the outer edge of the film substrate.

6. The image input device according to claim 1, wherein the optical system comprises a Selfoc lens array for forming an erect unmagnified image of the subject on the one-dimensional image pickup element.

7. The image input device according to claim 1, further comprising a light irradiator disposed in the cylinder for irradiating light to the subject coming into contact with the outer peripheral surface of the cylinder.

8. An image input device comprising:
a transparent cylinder supported so as to be freely rotatable around a rotational axis thereof;
a one-dimensional image pickup element disposed in the cylinder; and
an optical system which is disposed in the cylinder and which forms an image of a subject coming into contact with the outer peripheral surface of the cylinder on the one-dimensional image pickup element;
wherein the optical system comprises: (i) a lens optical system to which light reflected from the subject is incident, and from which the reflected light is emitted, and (ii) a reflection optical system which reflects the light emitted from the lens optical system at least twice to emit the light substantially in parallel to an optical axis of the lens optical system and in a direction opposite to a direction along which the light is emitted from the lens optical system, wherein the one-dimensional image pickup element receives the light emitted from the reflection optical system; and wherein the reflection optical system comprises a prism including: a light-incident face to which the light emitted from the lens optical system is incident, a first total reflection face for totally reflecting the light incident from the light-incident face, and a second total reflection face to which the light reflected from the first total reflection face is incident and from which the incident light is totally reflected to the light-incident face, wherein the light that is totally-reflected from the second total reflection face is incident through the light-incident face to the one-dimensional image pickup element.

9. The image input device according to claim 8, further comprising a light irradiator, which is supported on a front surface of a substrate disposed in the cylinder, and which irradiates light to a portion of the peripheral surface of the cylinder with which the subject comes into contact;

wherein the one-dimensional image pickup element is mounted on a back surface of the substrate.

10. The image input device according to claim 9, further comprising light irradiator which irradiates light to a portion of the peripheral surface of the cylinder with which the subject comes into contact;

wherein the light irradiator is positioned outside of the cylinder.

11. The image input device according to claim 8, wherein the lens optical system comprises a Selfoc lens array.

* * * * *